United States Patent
Moon et al.

(10) Patent No.: US 11,642,613 B2
(45) Date of Patent: May 9, 2023

(54) OIL-WATER SEPARATION FILTER STRUCTURE AND OIL-WATER SEPARATOR COMPRISING THE SAME

(71) Applicant: KOREA INSTITUTE OF SCIENCE AND TECHNOLOGY, Seoul (KR)

(72) Inventors: Myoung-Woon Moon, Seoul (KR); Young-A Lee, Seoul (KR); Seo-Hyun Cho, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 17/229,867

(22) Filed: Apr. 14, 2021

(65) Prior Publication Data

US 2021/0316237 A1 Oct. 14, 2021

(30) Foreign Application Priority Data

Apr. 14, 2020 (KR) .................. 10-2020-0045429

(51) Int. Cl.
*C02F 1/40* (2023.01)
*B01D 17/022* (2006.01)
(Continued)

(52) U.S. Cl.
CPC ....... *B01D 36/008* (2013.01); *B01D 17/0214* (2013.01); *B01D 17/045* (2013.01);
(Continued)

(58) Field of Classification Search
CPC ............ B01D 17/0202; B01D 17/0214; B01D 17/045; B01D 17/08; B01D 17/10;
(Continued)

(56) References Cited

U.S. PATENT DOCUMENTS 3,161,522 A * 12/1964 Compton ............... B01D 33/04
210/400
3,231,091 A * 1/1966 Kingsbury ........... B01D 17/045
210/DIG. 5
(Continued)

FOREIGN PATENT DOCUMENTS

JP 2004337791 A 12/2004
JP 2016064389 A 4/2016
(Continued)

OTHER PUBLICATIONS

Office Action dated Dec. 29, 2021 of Korean Patent Application No. 10-2020-0045429.

*Primary Examiner* — Christopher Upton
(74) *Attorney, Agent, or Firm* — Cantor Colburn LLP

(57) ABSTRACT

The present disclosure is directed to providing an oil-water separation filter structure including a base guide having a separated water outlet hole through which a fluid separated from a mixed fluid including an impurity exits, an oil-water separation filter disposed on the base guide to separate the impurity and the fluid included in the mixed liquid, and a top guide disposed on the oil-water separation filter, having at least one mixed fluid inlet hole through which the mixed fluid enters, and coupled to the base guide.
According to the present disclosure, the oil-water separation filter structure includes a hydrophilic material to separate water and oil, and as opposed to the existing nonwoven fabric type filters, can be continuously used, thereby preventing environmental pollution problems.

15 Claims, 18 Drawing Sheets

(51) Int. Cl.
*B01D 36/00* (2006.01)
*B01D 17/02* (2006.01)
*B01D 17/04* (2006.01)
*B01D 17/00* (2006.01)

(52) U.S. Cl.
CPC ................ *B01D 17/08* (2013.01); *C02F 1/40* (2013.01); *B01D 2221/04* (2013.01)

(58) Field of Classification Search
CPC ........ B01D 29/05; B01D 33/04; B01D 35/34; B01D 2201/0407; C02F 1/40
USPC ................ 210/400, 416.1, 455, 799, DIG. 5
See application file for complete search history.

(56) References Cited

U.S. PATENT DOCUMENTS

| | | | | | |
|---|---|---|---|---|---|
| 3,747,773 | A | * | 7/1973 | Jackson | B01D 29/05 210/506 |
| 4,059,528 | A | * | 11/1977 | Grosshandler | B01D 17/0202 210/924 |
| 4,371,441 | A | * | 2/1983 | Mathes | E02B 15/06 210/799 |
| 5,888,399 | A | * | 3/1999 | Rutledge | B01D 17/0202 210/799 |
| 6,068,779 | A | * | 5/2000 | Dzhragatspanyan | B01D 17/045 210/DIG. 5 |
| 6,951,613 | B2 | * | 10/2005 | Reif | A61M 5/284 210/416.1 |
| 2015/0203370 | A1 | * | 7/2015 | Hwang | C02F 1/40 210/489 |
| 2015/0259221 | A1 | * | 9/2015 | Moon | B01D 17/10 210/507 |
| 2018/0179718 | A1 | * | 6/2018 | Lee | C02F 1/40 |

FOREIGN PATENT DOCUMENTS

| | | |
|---|---|---|
| JP | 2018008221 A | 1/2018 |
| KR | 10-0711296 B1 | 4/2007 |
| KR | 1020150108287 A | 9/2015 |

\* cited by examiner

OIL-WATER SEPARATION FILTER STRUCTURE AND OIL-WATER SEPARATOR COMPRISING THE SAME

CROSS-REFERENCE TO RELATED APPLICATIONS

This application claims priority under 35 U.S.C. § 119 to Korean Patent Application No. 10-2020-0045429, filed on Apr. 14, 2020, in the Korean Intellectual Property Office, the disclosure of which is incorporated herein by reference in its entirety.

TECHNICAL FIELD

The present disclosure relates to an oil-water separation filter structure for collecting oil floating in oceans or rivers and an oil-water separator comprising the same, and more particularly, to an oil-water separation filter structure including a hydrophilic material to separate oil and water, and an oil-water separator comprising the oil-water separation filter structure having a predetermined angle to an installation surface to separate oil and water and collect the separated oil.

BACKGROUND

Recently, oil spill accidents frequently occur in oceans or rivers by a variety of reasons, and when oil spill accidents occur in oceans or rivers, oil or Hazardous & Noxious Substance (HNS) on sea or river surfaces spreads out quickly, causing severe environmental pollution.

Accordingly, to prevent water pollution, above all else, it is the most important to prevent accidents of a variety of transportation means including ships moving across oceans or rivers, and when oil or HNS spill accidents occurred, it is important to remove the spilled oil or HNS quickly.

Meanwhile, in the event of oil spills, commonly used methods include a method which sprays emulsifiers onto water on which oil floats to settle out the oil to the bottom of seas or rivers, or a method which removes oil at shores using booms after pollutants spread to the shores.

However, the emulsifiers cause secondary pollution due to oil settled out on the bottom, and oil removal using the booms is used after pollutants have already spread out very seriously, so it is necessary to develop technology for effectively controlling oil spread and collecting oil immediately after oil spills.

To collect oil, oil skimmers may be used, but it is reported that oil skimmers collect more water than oil, and thus more water than oil is stored in oil storage, resulting in low oil collection efficiency.

Meanwhile, another approach is an oil-water separation method for separating spilled oil from water by controlling surface energy such as hydrophilicity and hydrophobicity on the surface.

The oil-water separation method may be largely classified into a method which allows oil to pass and filter out water using an ultrahydrophobic filter having low surface energy, and a method which allows water to pass using a hydrophilic or ultrahydrophilic filter having high surface energy and prevents oil from passing by a water membrane formed on the filter.

As mentioned above, to remove oil spilled in oceans or rivers, the existing oil skimmers including booms, emulsifiers and lipophilic materials have low oil collection performance, and accordingly it is necessary to develop equipment for water and oil separation including a hydrophilic material.

RELATED LITERATURES

Patent Literatures
Korean Patent No. 10-0711296 (Apr. 18, 2007)

SUMMARY

The present disclosure is designed under the above-described background, and therefore the present disclosure is directed to providing an oil-water separation filter structure including a hydrophilic material for effectively separating oil and water in a mixed fluid.

Additionally, the present disclosure is directed to providing an oil-water separator comprising the oil-water separation filter structure including a hydrophilic material, installed at a predetermined angle to an installation surface, to allow a mixed fluid including water and oil to move along the slope of the oil-water separation filter structure, so that the water is discharged in the downward direction of the oil-water separation filter structure and the oil is collected in a separated oil storage provided at the end of the oil-water separation filter structure.

The object of the present disclosure is not limited to those described herein, and other objects not mentioned herein will be clearly understood by those skilled in the art from the following description.

To achieve the above-described object, an embodiment of the present disclosure provides an oil-water separation filter structure including a base guide having a separated water outlet hole through which a fluid separated from a mixed fluid including an impurity exits, an oil-water separation filter disposed on the base guide to separate the impurity and the fluid included in the mixed liquid, and a top guide disposed on the oil-water separation filter, having at least one mixed fluid inlet hole through which the mixed fluid enters, and coupled to the base guide.

Additionally, there is provided an oil-water separator comprising an oil-water separation filter structure, including the oil-water separation filter structure including a base guide having a separated water outlet hole through which a fluid separated from a mixed fluid including an impurity exits, an oil-water separation filter disposed on the base guide to separate the impurity and the fluid included in the mixed liquid and a top guide disposed on the oil-water separation filter, having at least one mixed fluid inlet hole through which the mixed fluid enters and coupled to the base guide, and a supporting device coupled to a bottom of the oil-water separation filter structure and supporting two ends of the oil-water separation filter structure at different heights to form a predetermined angle between the oil-water separation filter structure and an installation surface.

The oil-water separation filter structure according to the embodiments of the present disclosure includes the hydrophilic material to separate water and oil, and as opposed to the existing nonwoven fabric type filters, can be continuously used, thereby preventing environmental pollution problems.

Additionally, the oil-water separator comprising the oil-water separation filter structure according to an embodiment of the present disclosure separates water and oil while allowing the mixed liquid to move along the oil-water separation filter structure having the slope, thereby achieving continuous and repeated oil collection without any power supply other than the power for feeding the mixed liquid to the oil-water separation filter structure.

Furthermore, the oil-water separation filter has the oil-water separation space to increase the contact time and the contact area between the water and the oil-water separation filter surface, thereby increasing the oil water separation efficiency of the oil-water separation filter.

DETAILED DESCRIPTION OF EMBODIMENTS

Hereinafter, some embodiments of the present disclosure will be described in detail through the exemplary drawings. It should be noted that in adding the reference signs to the elements of each drawing, like elements have like reference signs if possible even though they are indicated on different drawings. Additionally, in describing the present disclosure, when a certain detail of relevant known elements or functions is determined to render the subject matter of the present disclosure vague, the detailed description is omitted herein.

Furthermore, in describing the elements of the present disclosure, the terms 'first', 'second', A, B, (a), (b), and the like may be used. These terms are only used to distinguish one element from another, and the nature of the corresponding element or its sequence or order is not limited by the term. It should be understood that when an element is referred to as being "connected", "coupled" or "linked" to another element, it may be directly connected or linked to other element, but intervening elements may be "connected", "coupled" or "linked" between each element.

Figure 1:
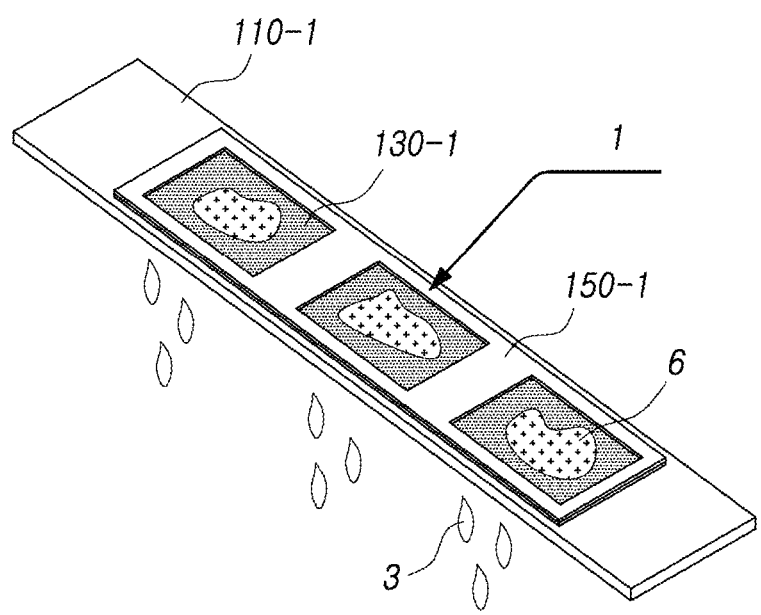
FIG. 1 is a perspective view showing the whole configuration of an oil-water separation filter structure according to an embodiment of the present disclosure.
Figure 2:
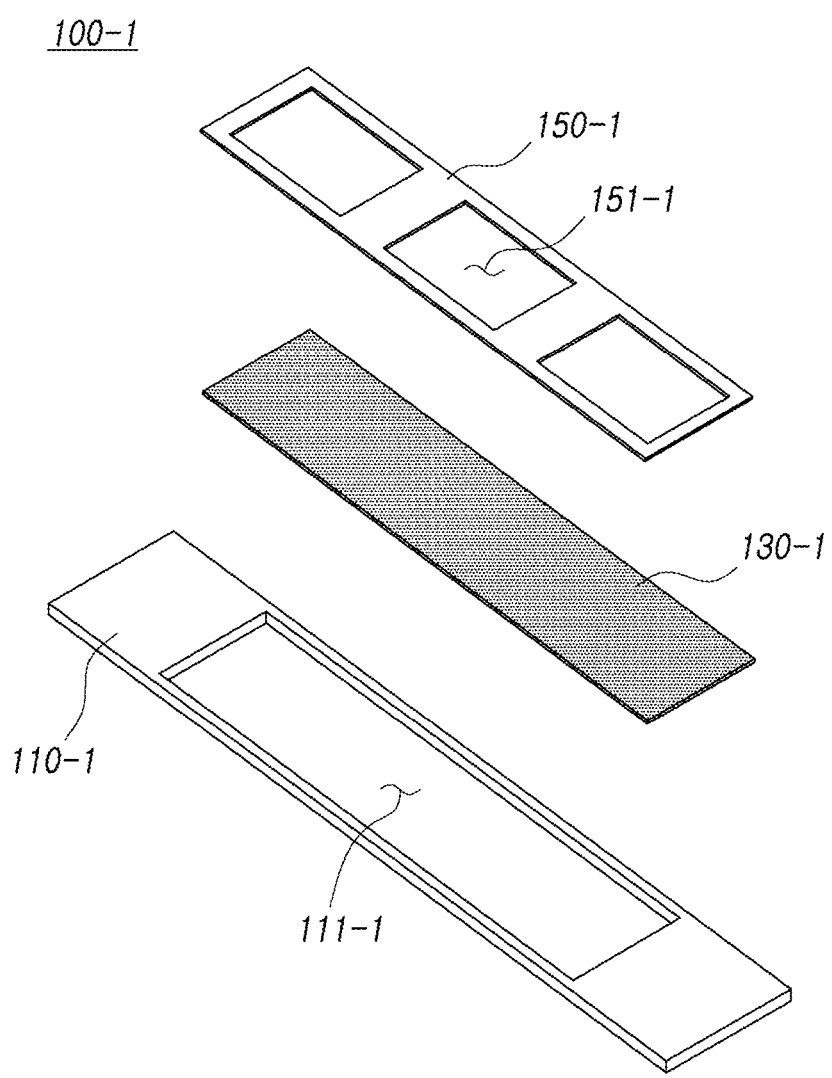
FIG. 2 is an exploded perspective view showing the whole configuration of an oil-water separation filter structure according to an embodiment of the present disclosure.

First, as shown in FIGS. 1 and 2, an oil-water separation filter structure 100-1 according to an embodiment of the present disclosure includes a base guide 110-1 having a separated water outlet hole 111-1 through which a fluid 3 separated from a mixed fluid 1 including an impurity 6 exits; an oil-water separation filter 130-1 disposed on the base guide 110-1 to separate the impurity 6 and the fluid 3 included in the mixed liquid 1; and a top guide 150-1 disposed on the oil-water separation filter 130-1, having at least one mixed fluid inlet hole 151-1 through which the mixed fluid 1 enters, and coupled to the base guide 110-1.

First, the oil-water separation filter structure 100-1 according to an embodiment of the present disclosure separates the impurity 6 and the fluid 3 other than the impurity 6 in the mixed fluid 1 including the impurity 6.

Here, the impurity 6 may be oil, the fluid 3 other than the impurity may be water, and the mixed liquid 1 may be seawater needed to clean up oil spills (The following description is made based on the impurity 6 being oil and the fluid 3 being water).

The oil-water separation filter structure 100-1 according to an embodiment of the present disclosure may be used to clean up oil spills in oceans, and may function to separate the oil 6 and the water 3 as a component of oil-water separators 10, 11 as described below.

Hereinafter, each component of the oil-water separation filter structure 100-1 according to an embodiment of the present disclosure will be described in detail with reference to FIGS. 1 and 2.

First, the base guide 110-1 has the separated water outlet hole 111-1 through which the water 3 separated from the mixed fluid 1 including the oil 6 exits.

The base guide 110-1 may be formed in the shape of, for example, a plate, and has the separated water outlet hole 111-1 through which the water 3 separated by the oil-water separation filter 130-1 exits.

The separated water outlet hole 111-1 may be formed in a rectangular shape, but is not limited thereto, and may be formed in a variety of shapes.

Subsequently, the oil-water separation filter 130-1 is disposed on the base guide 110-1, and separates the oil 6 and the water 3 included in the mixed liquid 1.

The oil-water separation filter 130-1 may be disposed on the base guide 110-1, and the oil-water separation filter 130-1 may be formed in a shape corresponding to the shape of the base guide 110-1 and disposed on the base guide 110-1.

The oil-water separation filter 130-1 may be completely fixed to the top of the base guide 110-1, and the oil-water separation filter 130-1 may be detachably coupled for easy replacement.

Figure 16:
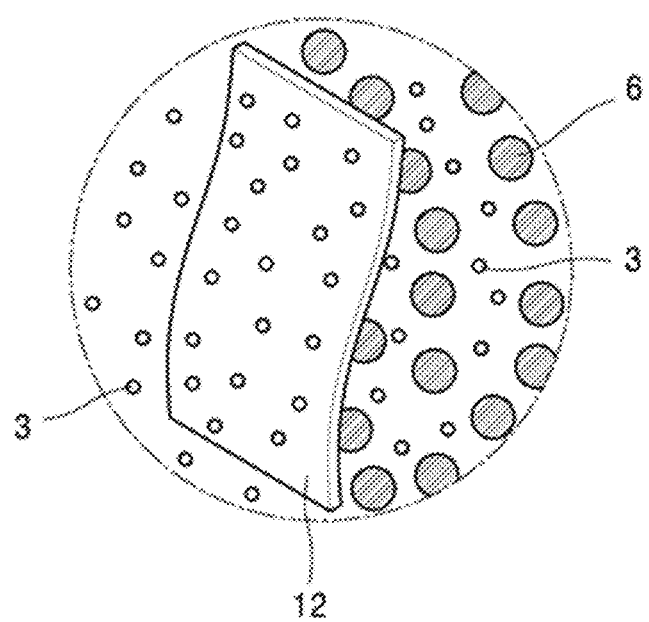
FIG. 16 is a diagram showing an example of selective permeation of an oil-water separation filter according to an embodiment of the present disclosure.

The oil-water separation filter 130-1 separates the oil 6 and the water 3 other than the impurity included in the mixed liquid 1, and the oil-water separation filter 130-1 according to an embodiment of the present disclosure may include a porous material 12 surface-treated to have hydrophilicity as shown in FIG. 16.

As the oil-water separation filter 130-1 includes the porous material 12 surface-treated to have hydrophilicity, a water membrane may be formed on the surface, and the water membrane formed on the surface of the oil-water separation filter 130-1 prevents the oil 6 from passing and selectively allows only the water 3 to pass.

In this instance, the porous material 12 may be hydrophilic when a contact angle with the water 3 is 0 to 50°, and the oil-water separation filter 130-1 may include micrometer-level pores to have hydrophilicity.

That is, the oil-water separation filter 130-1 according to an embodiment of the present disclosure includes a hydrophilic material to allow selective permeation of the oil 6 and the water 3, so that the water 3 included in the mixed fluid 1 supplied to the oil-water separation filter 130-1 passes through the oil-water separation filter 130-1 and the oil 6 remains on the oil-water separation filter 130-1.

Figure 17:
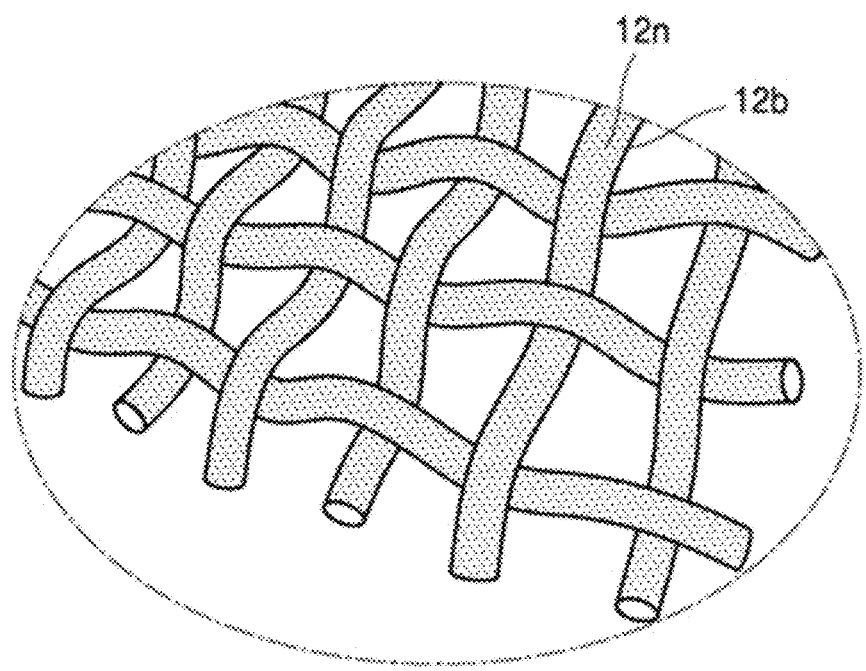
FIG. 17 is a diagram showing an example of a nano-protrusion structure formed on the surface of an oil-water separation filter according to an embodiment of the present disclosure.

Meanwhile, the oil-water separation filter 130-1 may be a net type mesh 12b which is a porous structure including mesh pores as shown in FIG. 17.

Here, the diameter of the mesh pores may be 1 to 1000 micrometers.

Additionally, the net type mesh 12b may be made of fiber strands arranged with gaps of about 1 to 1000 micrometers between the fiber strands to form macro-pores.

In this instance, the diameter of the fiber strands that form the net type mesh 12b may be 10 to 1000 micrometers.

Additionally, the oil-water separation filter 130-1 according to an embodiment of the present disclosure may have a nano-protrusion structure 12n on the surface as shown in FIG. 17.

Here, the nano-protrusion structure 12n may be 1 to 100 nanometers in diameter, and 1 to 1000 nanometers in length.

In this instance, the nano-protrusion structure 12n may be made of polymer, and the nano-protrusion structure 12n may be a nano-hair, a nanofiber, a nano-pillar, a nano-rod and a nano-wire.

The nano-protrusion structure 12n formed in the oil-water separation filter 130-1 improves the hydrophilicity on the surface of the oil-water separation filter 130-1.

The oil-water separation filter 130-1 is wettable with the water 3 and can absorb the water 3, thereby facilitating the passage of the water 3.

Accordingly, when the mixed fluid 1 including the oil 6 and the water 3 is allowed to pass through the oil-water separation filter 130-1, the water 3 easily passes through the oil-water separation filter 130-1, but the oil 6 does not pass through the oil-water separation filter 130-1 by the repulsive force between the oil 6 and the water 3 and is filtered out and trapped by the oil-water separation filter 130-1.

Figure 18:
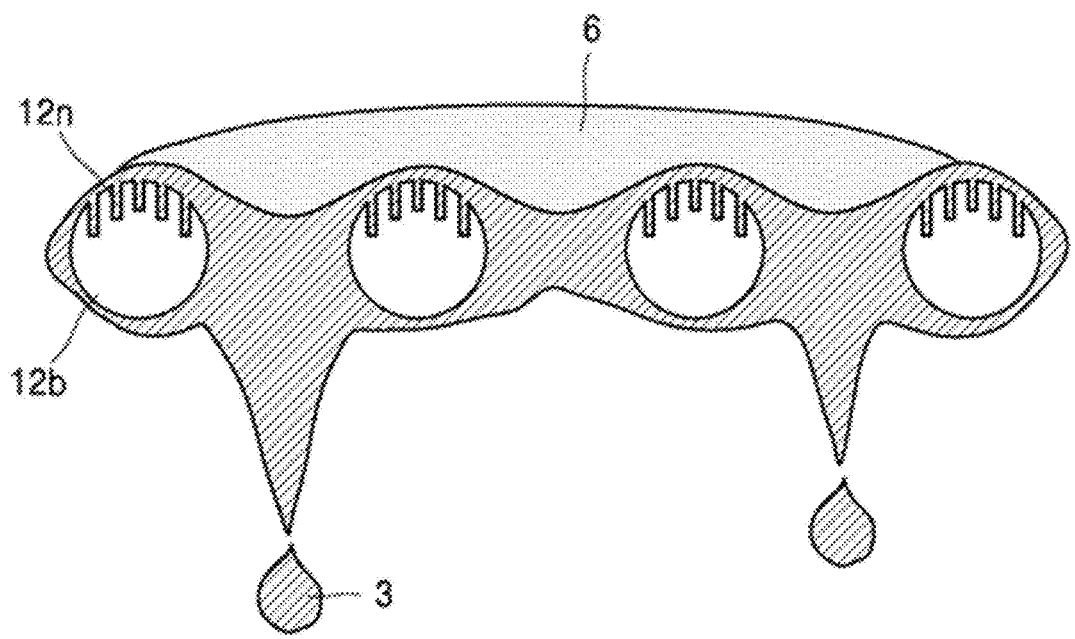
FIG. 18 is a diagram showing another example of a nano-protrusion structure of FIG. 17.

Meanwhile, the nano-protrusion structure 12n may be made by forming a plurality of grooves in the net type mesh 12b as shown in FIG. 18.

As the net type mesh 12b has an ultrahydrophilic property by the nano-protrusion structure 12n, when the water 3 and the oil 6 come into contact with the net type mesh 12b, a water membrane is formed on the surface of the net type mesh 12b due to a strong bond between the water 3 and the net type mesh 12b by the contact between the water 3 and the hydrophilic porous substrate surface.

Accordingly, the oil 6 cannot pass through the pores of the net type mesh 12b due to the repulsion by the water membrane on the surface of the net type mesh 12b, and eventually the oil 6 may be trapped by the oil-water separation filter 130-1.

Subsequently, the top guide 150-1 is disposed on the oil-water separation filter 130-1, has at least one mixed fluid inlet hole 151-1 through which the mixed fluid 1 enters, and is coupled to the base guide 110-1.

The top guide 150-1 may be formed in the shape of, for example, a plate, and in this instance, the top guide 150-1 may be formed in a shape corresponding to the base guide 110-1.

The top guide 150-1 has at least one mixed fluid inlet hole 151-1 through which the mixed fluid 1 supplied from the outside enters, and the mixed fluid inlet hole 151-1 may be formed in a rectangular shape, but is not limited thereto, and may be formed in a variety of shapes.

The top guide 150-1 may be disposed on the oil-water separation filter 130-1 and coupled to the base guide 110-1 to fix the underlying oil-water separation filter 130-1.

As described above, the oil-water separation filter structure 100-1 according to an embodiment of the present disclosure may include the base guide 110-1, the oil-water separation filter 130-1 and the top guide 150-1 to separate the oil 6 and the water 3 from the mixed liquid 1 supplied from the outside.

Subsequently, each component of an oil-water separation filter structure 100-2 according to another embodiment of the present disclosure will be described in detail with reference to FIGS. 3 to 5.

In describing the oil-water separation filter structure 100-2 according to another embodiment of the present disclosure, a description of the same structure and function as the above-described oil-water separation filter structure 100-1 according to an embodiment of the present disclosure is omitted herein.

First, a base guide 110-2 according to another embodiment of the present disclosure has at least one separated water outlet hole 111-2 at a location corresponding to a mixed fluid inlet hole 151-2.

The base guide 110-2 may have the separated water outlet hole 111-2 at the location corresponding to the location of the mixed fluid inlet hole 151-2 formed in a top guide 150-2, and in the number corresponding to the number of mixed fluid inlet holes 151-2 formed in the top guide 150-2.

Additionally, the top guide 150-2 according to another embodiment of the present disclosure includes a press portion 153-2 on the mixed fluid inlet hole 151-2 to press down a part of an oil-water separation filter 130-2 into the separated water outlet hole 111-2.

The top guide 150-2 may include the press portion 153-2 on a part of the mixed fluid inlet hole 151-2, and the press portion 153-2 is recessed in the downward direction of the top guide 150-2 on the mixed fluid inlet hole 151-2.

The top guide 150-2 may include at least one press portion 153-2 on the mixed fluid inlet hole 151-2, and the press portion 153-2 may be recessed in the downward direction of the top guide 150-2 and have a curved or bent shape.

When the top guide 150-2 is disposed on the oil-water separation filter 130-2, the press portion 153-2 presses down a part of the oil-water separation filter 130-2 into the separated water outlet hole 111-2.

As described above, the base guide 110-2 according to another embodiment of the present disclosure may have the separated water outlet hole 111-2 at the location corresponding to the location of the mixed fluid inlet hole 151-2 formed in the top guide 150-2, and in the number corresponding to the number of mixed fluid inlet holes 151-2 formed in the top guide 150-2.

Accordingly, when the top guide 150-2 is disposed on the oil-water separation filter 130-2, the press portion 153-2 may come into contact with a part of the oil-water separation filter 130-2 and press down the part of the oil-water separation filter 130-2 into the separated water outlet hole 111-2 formed at the location corresponding to the mixed fluid inlet hole 151-2.

Figure 3:
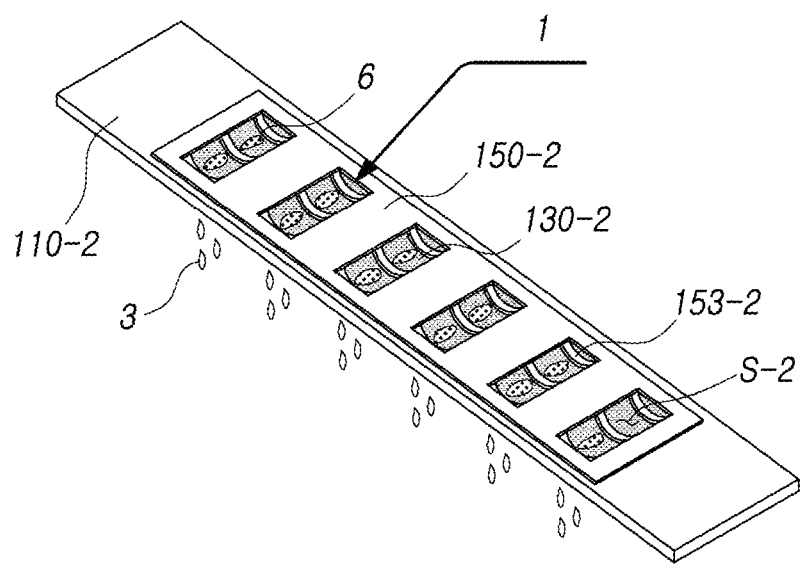
FIG. 3 is a perspective view showing the whole configuration of an oil-water separation filter structure according to another embodiment of the present disclosure.
Figure 4:
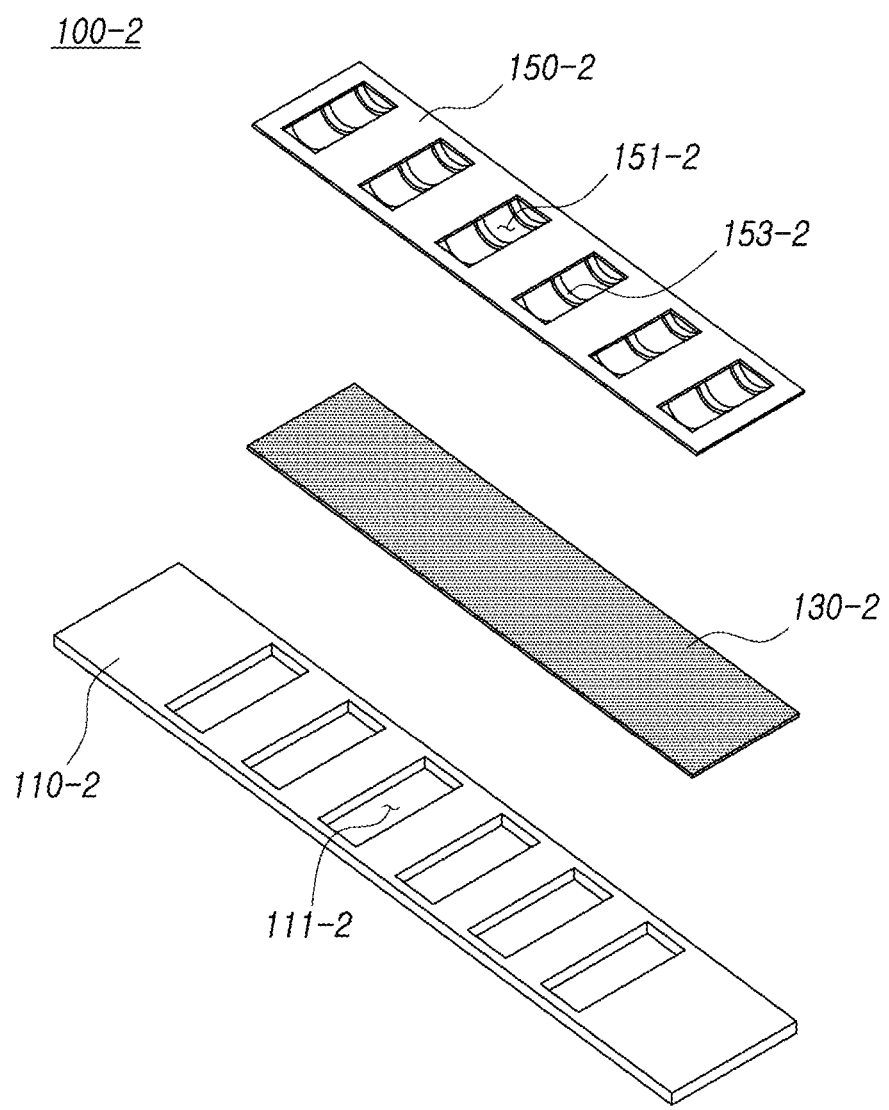
FIG. 4 is an exploded perspective view showing the whole configuration of an oil-water separation filter structure according to another embodiment of the present disclosure.

Meanwhile, as the part of the oil-water separation filter 130-2 according to another embodiment of the present disclosure is pressed down into the separated water outlet hole 111-2 formed in the base guide 110-2, an oil-water separation space S-2 for receiving the mixed fluid 1 is formed as shown in FIG. 3.

When the mixed fluid 1 is received in the oil-water separation space S-2, the contact area between the mixed fluid 1 and the oil-water separation filter 130-2 increases, thereby increasing the oil water separation efficiency of the oil-water separation filter 130-2.

Figure 5:
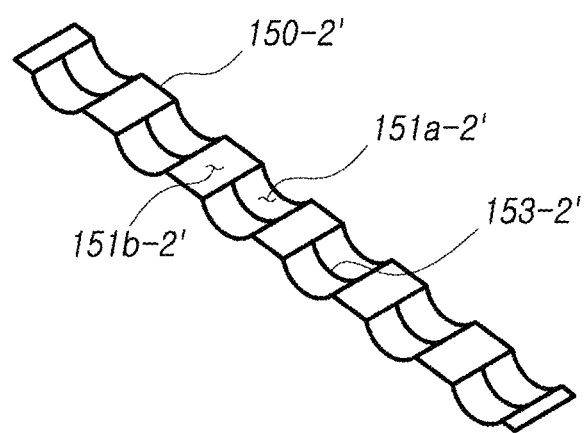
FIG. 5 is a perspective view showing another example of a top guide of an oil-water separation filter structure according to another embodiment of the present disclosure.

Meanwhile, a top guide 150-2' may be formed with an assembled structure of a plurality of frames as shown in FIG. 5.

When the top guide 150-2' includes the plurality of frames, the top guide 150-2' may have a mixed fluid inlet hole 151a-2' with a press portion 153-2' and a mixed fluid inlet hole 151b-2' without a press portion 153-2'.

Figure 6:
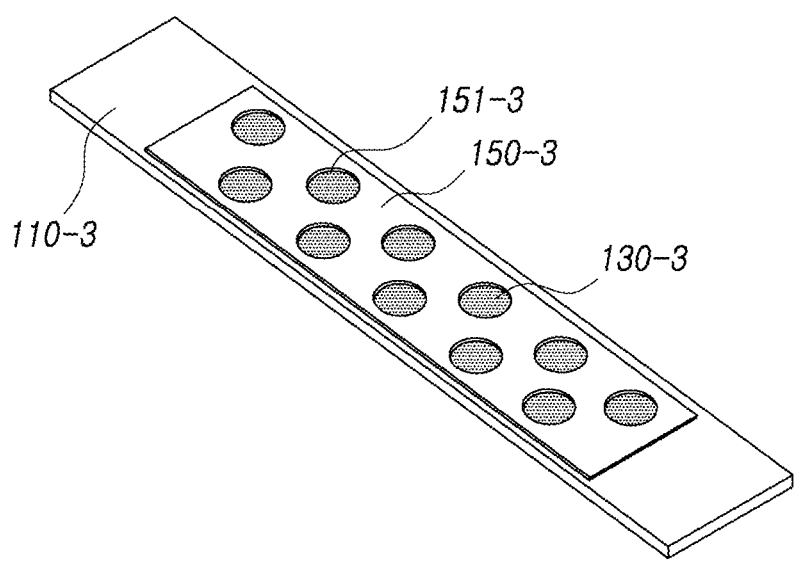
FIG. 6 is a perspective view showing the whole configuration of an oil-water separation filter structure according to still another embodiment of the present disclosure.
Figure 7:
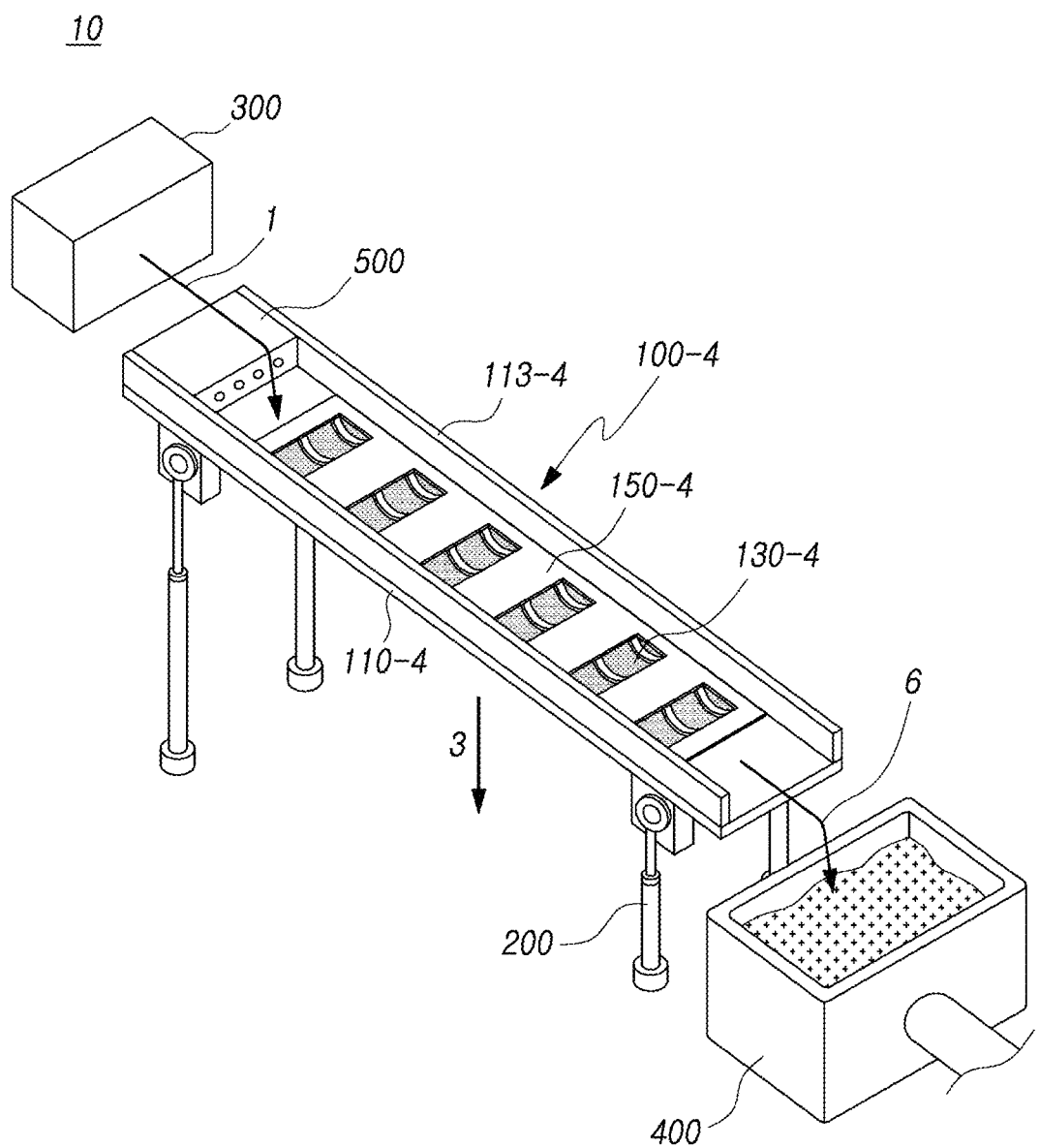
FIG. 7 is a perspective view showing the whole configuration of an oil-water separator comprising an oil-water separation filter structure according to an embodiment of the present disclosure.
Figure 8:
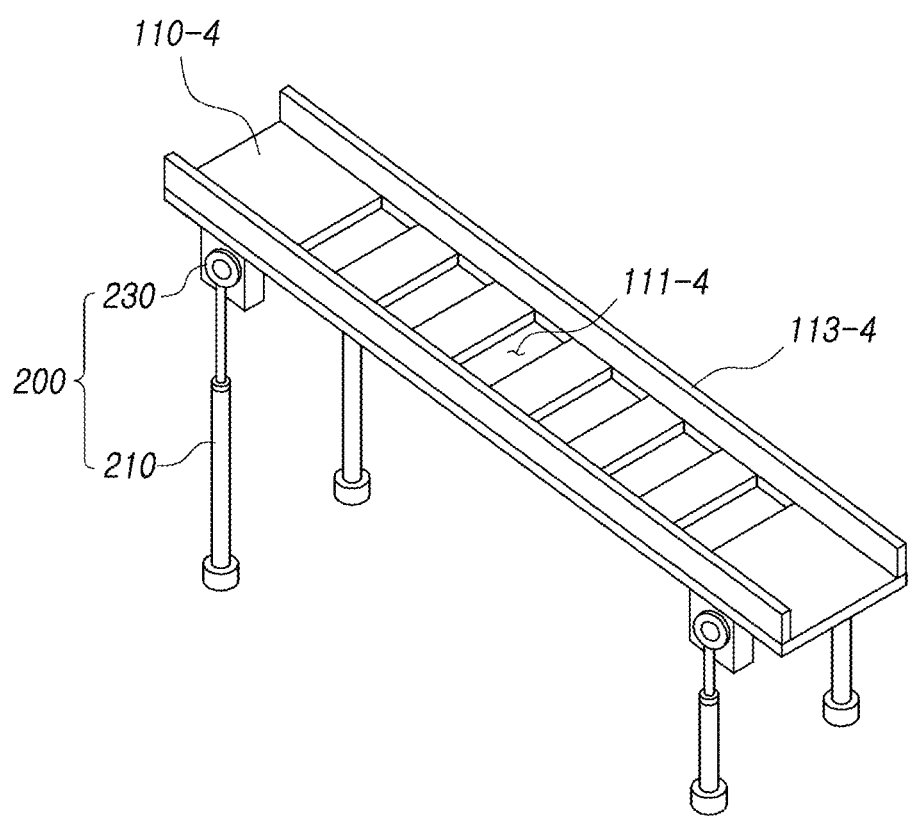
FIG. 8 is a perspective view showing an oil-water separation filter structure and a supporting device included in an oil-water separator according to an embodiment of the present disclosure.
Figure 9:
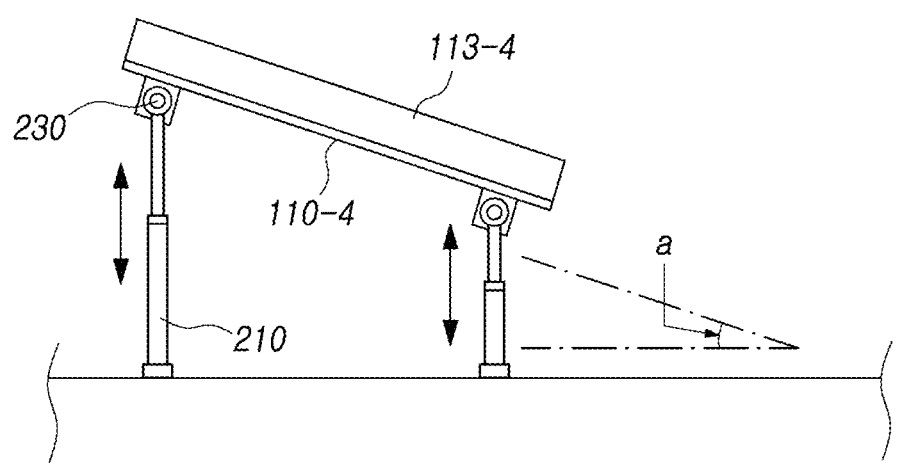
FIG. 9 is a side view showing an oil-water separation filter structure and a supporting device included in an oil-water separator according to an embodiment of the present disclosure.

Meanwhile, as shown in FIG. 6, an oil-water separation filter structure 100-3 according to still another embodiment of the present disclosure may include a base guide 110-3, an oil-water separation filter 130-3 and a top guide 150-3 in the same way as the oil-water separation filter structure 100-1 according to an embodiment of the present disclosure and the oil-water separation filter structure 100-2 according to another embodiment of the present disclosure as described above.

In this instance, a mixed fluid inlet hole 151-3 formed in the top guide 150-3 may be formed in a circular shape, and a plurality of mixed fluid inlet holes 151-3 may be arranged in a zigzag pattern.

Meanwhile, the base guides 110-1, 110-2, 110-3 and the top guides 150-1, 150-2, 150-2', 150-3 according to the embodiments of the present disclosure may be flexible.

That is, the base guides 110-1, 110-2, 110-3 and the top guides 150-1, 150-2, 150-2', 150-3 may be made of soft materials to have flexibility.

When the base guides 110-1, 110-2, 110-3 and the top guides 150-1, 150-2, 150-2', 150-3 according to the embodiments of the present disclosure are flexible, the oil-water separation filter structures 100-1, 100-2, 100-3 according to the embodiments of the present disclosure may form a belt by connecting two ends and rotate by at least one rotation axis element coupled to the inner side, to separate the oil 6 and the water 3 included in the mixed fluid 1.

Meanwhile, the top guides 150-1, 150-2, 150-3 according to the embodiments of the present disclosure may be made of a hydrophobic material.

As the top guides 150-1, 150-2, 150-3 according to the embodiments of the present disclosure are made of a hydrophobic material, when the top guides 150-1, 150-2, 150-3 are disposed on an oil-water separation filter 130-1, 130-2, 130-3, the water 3 included in the mixed fluid 1 can easily move to the oil-water separation filters 130-1, 130-2, 130-3, and the oil 6 cannot easily move to the oil-water separation filters 130-1, 130-2, 130-3, thereby increasing the oil water separation efficiency of the oil-water separation filters 130-1, 130-2, 130-3.

Subsequently, the oil-water separators 10, 11 comprising oil-water separation filter structures 100-4, 100-5 according to the embodiments of the present disclosure will be described.

First, as shown in FIGS. 7 to 13, the oil-water separator 10 comprising the oil-water separation filter structure 100-4 according to an embodiment of the present disclosure includes the oil-water separation filter structure 100-4 including a base guide 110-4 having a separated water outlet hole 111-4 through which the fluid 3 separated from the mixed fluid 1 including the impurity 6 exits, the oil-water separation filter 130-4 disposed on the base guide 110-4 to separate the impurity 6 and the fluid 3 included in the mixed liquid 1, and a top guide 150-4 disposed on the oil-water separation filter 130-4, having at least one mixed fluid inlet hole 151-4 through which the mixed fluid 1 enters, and coupled to the base guide 110-4; and a supporting device 200 coupled to the bottom of the oil-water separation filter structure 100-4 and supporting two ends of the oil-water separation filter structure 100-4 at different heights to form a predetermined angle a between the oil-water separation filter structure 100-4 and an installation surface.

Hereinafter, each component of the oil-water separator 10 according to an embodiment of the present disclosure will be described in detail with reference to FIGS. 7 to 13.

The oil-water separator 10 comprising the oil-water separation filter structure 100-4 according to an embodiment of the present disclosure is an apparatus for separating the impurity 6 and the fluid 3 in the mixed fluid 1 including the impurity 6 and the fluid 3 other than the impurity 6 and collecting the impurity 6, and in this instance, the impurity 6 included in the mixed fluid 1 may be oil, and the fluid 3 may be water (The following description is made based on the impurity 6 being oil and the fluid 3 being water).

The oil-water separator 10 according to an embodiment of the present disclosure may be provided to collect the oil 6 in a ship used to clean up the oil 6 spilled in oceans or rivers, and in this instance, the oil-water separator 10 may be provided in the ship's fore.

Here, the oil-water separator 10 according to an embodiment of the present disclosure may include a fluid suction means 300 to suck the mixed fluid 1 including the water 3 and the oil 6 from oceans or rivers.

The fluid suction means 300 may be provided as, for example, a lifting pump to transfer the mixed fluid from a lower location to a higher location, and may be installed near the higher one of the two ends of the oil-water separation filter structure 100-4.

The fluid suction means 300 sucks the mixed fluid 1 including the water 3 and the oil 6 from oceans or rivers, and supplies the sucked mixed fluid 1 to the higher one of the two ends of the oil-water separation filter structure 100-4.

Subsequently, the oil-water separation filter structure 100-4 has the two ends of different heights to form the predetermined angle a to the installation surface, to separate the oil 6 and the water 3 other than the oil 6 in the mixed fluid 1 including the oil 6.

The oil-water separation filter structure 100-4 has different heights at the two ends by the supporting device 200 as described below, to form a slope having the predetermined angle a to the installation surface.

As the oil-water separation filter structure 100-4 has the predetermined angle a to the installation surface, the mixed fluid 1 supplied from the fluid suction means 300 may move by the gravitational force.

The mixed fluid 1 supplied to the higher one of the two ends of the oil-water separation filter structure 100-4 is separated into the oil 6 and the water 3 by the oil-water separation filter 130-4 included in the oil-water separation filter structure 100-4 while moving along the oil-water separation filter structure 100-4.

In this instance, the angle a between the oil-water separation filter structure 100-4 and the installation surface may be 0 to 45°, and when the angle a between the oil-water separation filter structure 100-4 and the installation surface is higher than 45°, the speed of the mixed fluid 1 moving on the oil-water separation filter structure 100-4 increases so much, resulting in reduced oil water separation efficiency.

The angle a between the oil-water separation filter structure 100-4 and the installation surface is preferably 20° to allow the mixed fluid 1 to smoothly move and maintain the oil water separation efficiency.

In more detail, the oil-water separation filter structure 100-4 includes the base guide 110-4 having the separated water outlet hole 111-4 through which the separated water 3 exits; the oil-water separation filter 130-4 disposed on the base guide 110-4 to separate the oil 6 and the water 3 included in the mixed liquid 1; and the top guide 150-4 disposed on the oil-water separation filter 130-4, having at least one mixed fluid inlet hole 151-4 through which the mixed fluid 1 enters, and coupled to the base guide 110-4.

First, the base guide 110-4 has the separated water outlet hole 111-4 through which the separated water 3 exits.

The base guide 110-4 may be formed in the shape of, for example, a plate, and has the separated water outlet hole 111-4 through which the water 3 separated by the oil-water separation filter 130-4 exits.

The separated water outlet hole 111-4 may be formed in a rectangular shape, but is not limited thereto, and may be formed in a variety of shapes.

Meanwhile, the base guide 110-4 includes a guide wall 113-4 on two sides to prevent the leakage of the mixed fluid 1 moving along the oil-water separation filter 130-4 disposed on the base guide 110-4.

In more detail, the guide walls 113-4 may extend from the two sides of the base guide 110-4 along the lengthwise direction of the base guide 110-4, respectively.

Subsequently, the oil-water separation filter 130-4 is disposed on the base guide 110-4 to separate the oil 6 and the water 3 included in the mixed liquid 1.

The oil-water separation filter 130-4 included in the oil-water separator 10 according to an embodiment of the present disclosure may be made of the same material as the above-described oil-water separation filter 130-1 and perform the same function, and its detailed description is omitted herein.

Subsequently, the top guide 150-4 is disposed on the oil-water separation filter 130-4, has at least one mixed fluid inlet hole 151-4 through which the mixed fluid 1 enters, and is coupled to the base guide 110-4.

The top guide 150-4 may be formed in the shape of, for example, a plate, and in this instance, the top guide 150-4 may be formed in a shape corresponding to the base guide 110-4.

The top guide 150-4 has at least one mixed fluid inlet hole 151-4 through which the mixed fluid 1 supplied from the fluid suction means 300 enters, and the mixed fluid inlet hole 151-4 may be formed in a rectangular shape, but is not limited thereto, and may be formed in a variety of shapes.

The top guide 150-4 may be disposed on the oil-water separation filter 130-4 and coupled to the base guide 110-4 to fix the underlying oil-water separation filter 130-4.

Meanwhile, the base guide 110-4 has at least one separated water outlet hole 111-4 at a location corresponding to the mixed fluid inlet hole 151-4.

The base guide 110-4 may have the separated water outlet hole 111-4 formed at the location corresponding to the location of the mixed fluid inlet hole 151-4 formed in the top guide 150-4, and in the number corresponding to the number of mixed fluid inlet holes 151-4 formed in the top guide 150-4.

Additionally, the top guide 150-4 includes a press portion 153-4 on the mixed fluid inlet hole 151-4 to press down a part of the oil-water separation filter 130-4 into the separated water outlet hole 111-4.

The top guide 150-4 may include the press portion 153-4 on a part of the mixed fluid inlet hole 151-4, and the press portion 153-4 is recessed in the downward direction of the top guide 150-4 on the mixed fluid inlet hole 151-4.

The top guide 150-4 may include at least one press portion 153-4 on the mixed fluid inlet hole 151-4, and the press portion 153-4 may be recessed in the downward direction of the top guide 150-4 and have a curved or bent shape.

Figure 11:
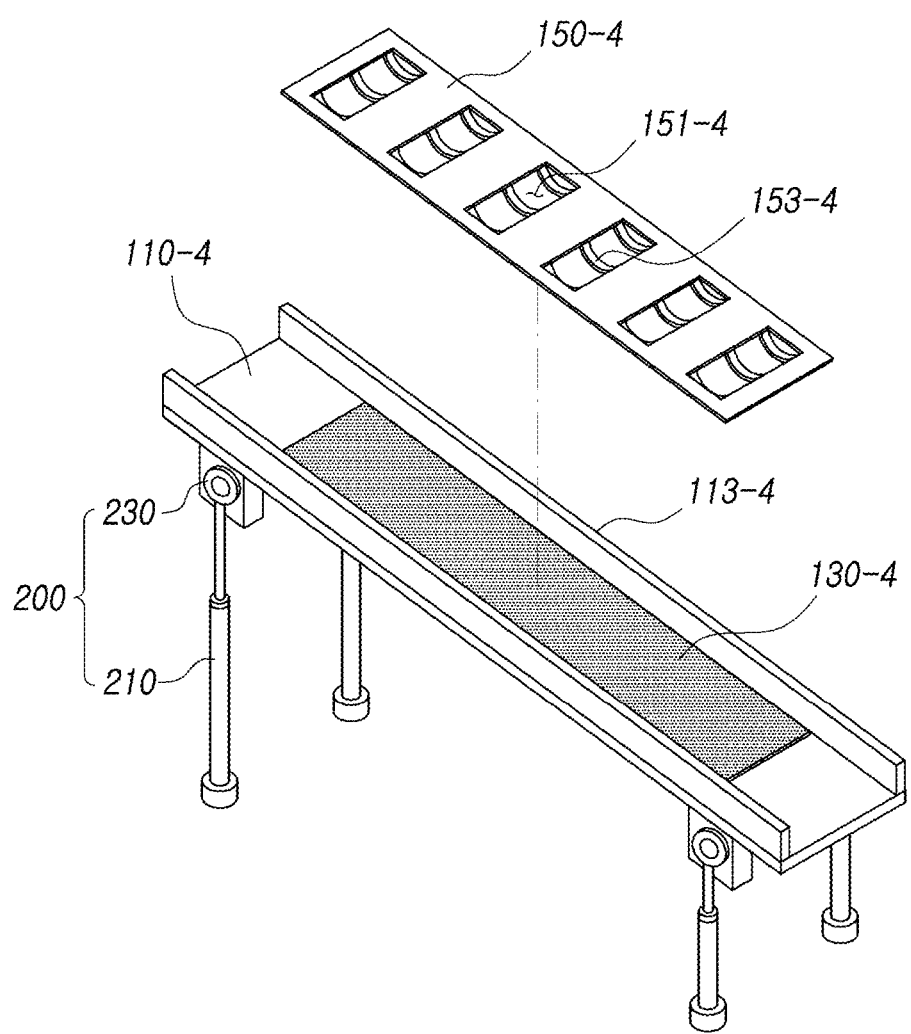
FIG. 11 is an exploded perspective view showing an oil-water separation filter structure and a supporting device included in an oil-water separator according to an embodiment of the present disclosure.
Figure 12:
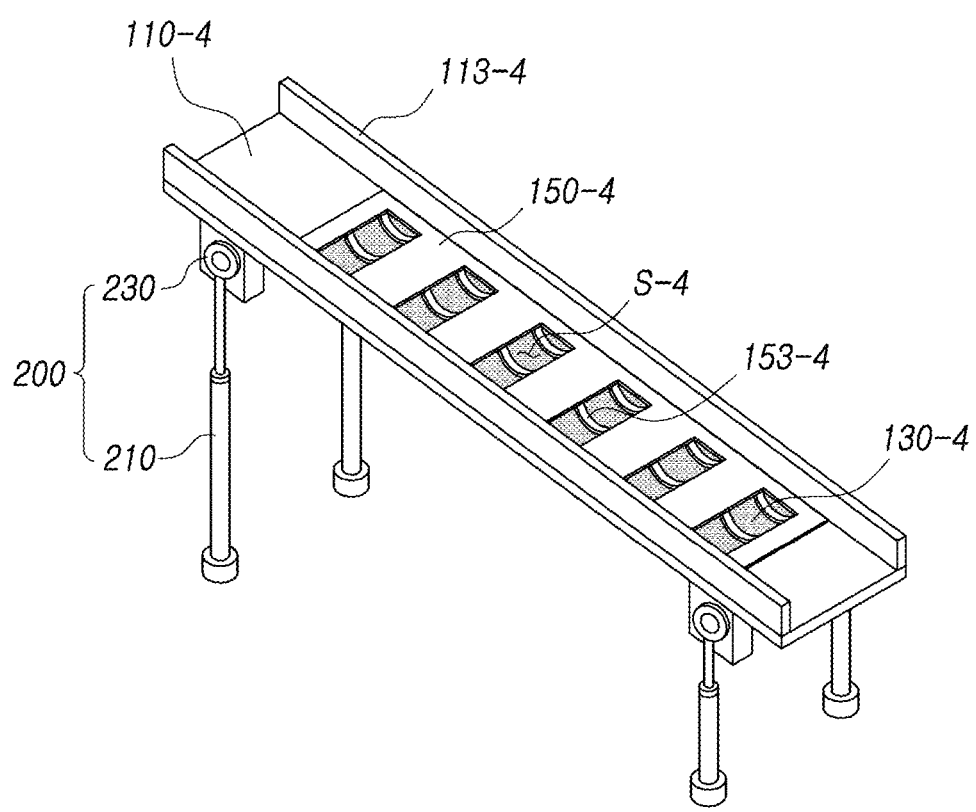
FIG. 12 is an assembled perspective view showing an oil-water separation filter structure and a supporting device included in an oil-water separator according to an embodiment of the present disclosure.

As shown in FIGS. 11 and 12, when the top guide 150-4 is disposed on the oil-water separation filter 130-4, the press portion 153-4 presses down a part of the oil-water separation filter 130-4 into the separated water outlet hole 111-4.

As described above, the base guide 110-4 may have the separated water outlet hole 111-4 at the location corresponding to the location of the mixed fluid inlet hole 151-4 formed in the top guide 150-4, and in the number corresponding to the number of mixed fluid inlet holes 151-4 formed in the top guide 150-4.

Accordingly, when the top guide 150-4 is disposed on the oil-water separation filter 130-4, the press portion 153-4 may contact the oil-water separation filter 130-4 and press down a part of the oil-water separation filter 130-4 into the separated water outlet hole 111-4 formed at the location corresponding to the mixed fluid inlet hole 151-4.

Figure 10:
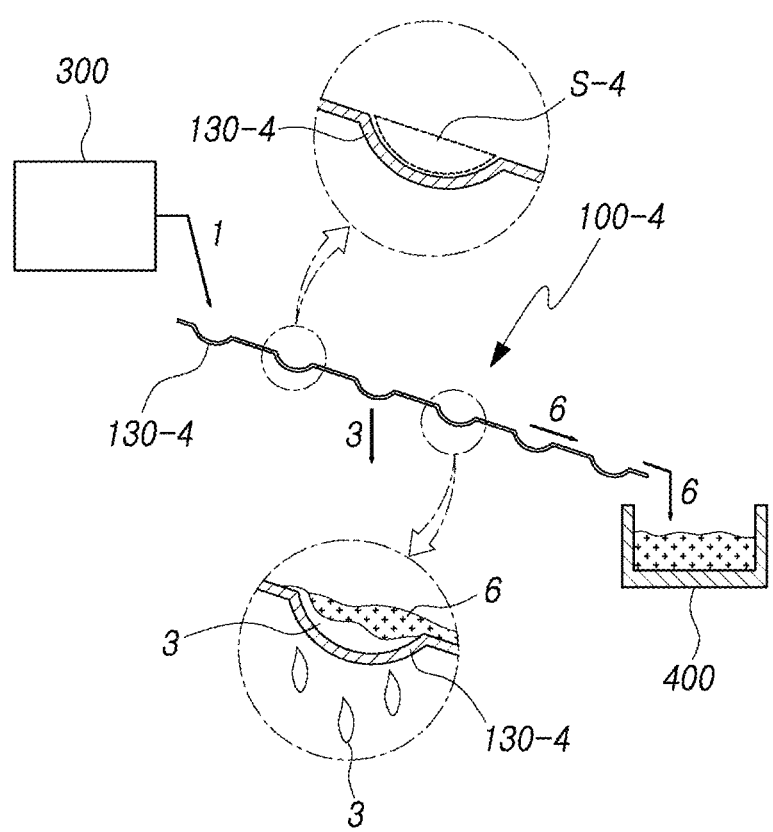
FIG. 10 is a side view showing the separation of an impurity and a fluid other than the impurity included in a mixed fluid by an oil-water separation filter structure included in an oil-water separator according to an embodiment of the present disclosure.

As the part of the oil-water separation filter 130-4 is pressed down into the separated water outlet hole 111-4 formed in the base guide 110-4, an oil-water separation space S-4 for receiving the mixed fluid 1 is formed as shown in FIGS. 10 and 12.

Referring to FIG. 10, the oil-water separation space S-4 may receive the mixed liquid 1 moving along the slope of the oil-water separation filter 130-4, and in this instance, due to a difference in specific weight between the water 3 and the oil 6, a fluid layer made of the water may be formed below the oil-water separation space S-4, and a fluid layer made of the oil 6 may be formed on the oil-water separation space S-4.

That is, when the mixed liquid 1 moving along the oil-water separation filter 130-4 enters the oil-water separation space S-4 formed in the oil-water separation filter 130-4, due to a difference in specific weight between the water 3 and the oil 6, the water 3 is disposed below the oil-water separation space S-4, and the oil 6 is disposed on the oil-water separation space S-4.

As the water 3 is disposed below the oil-water separation space S-4, the contact area between the water 3 and the oil-water separation filter 130-4 increases, thereby significantly increasing the oil water separation efficiency of the oil-water separation filter 130-4.

Additionally, as the mixed liquid 1 is received in the oil-water separation space S-4, the movement of the mixed liquid 1 stops, and accordingly the contact time between the water 3 and the oil-water separation filter 130-4 increases, thereby significantly increasing the oil water separation efficiency of the oil-water separation filter 130-4.

Meanwhile, the top guide 150-4 may be made of a hydrophobic material.

As the top guide 150-4 is made of a hydrophobic material, when the top guide 150-4 is disposed on the oil-water separation filter 130-4, the water 3 included in the mixed fluid 1 can easily move to the oil-water separation filter 130-4, and the oil 6 cannot easily move to the oil-water separation filter 130-4, thereby increasing the oil water separation efficiency of the oil-water separation filter 130-4.

Meanwhile, the oil-water separator 10 according to an embodiment of the present disclosure may further include a separated oil storage 400 disposed at the lower one of the two ends of the oil-water separation filter structure 100-4 to collect the oil 6 separated from the oil-water separation filter structure 100-4, and the oil 6 separated by the oil-water separation filter structure 100-4 may flow down along the slope of the oil-water separation filter structure 100-4 and be collected in the separated oil storage 400.

Subsequently, the supporting device 200 is coupled to the bottom of the oil-water separation filter structure 100-4 and supports the two ends of the oil-water separation filter structure 100-4 at different heights to form the predetermined angle a between the oil-water separation filter structure 100-4 and the installation surface.

The supporting device 200 may have the top coupled to the bottom of the oil-water separation filter structure 100-4 and the bottom fixedly installed in the installation surface of the oil-water separation filter structure 100-4, and when the oil-water separation filter structure 100-4 is formed in the shape of a plate having a predetermined length and width as described above, four supporting devices 200 may be each coupled to the edges of the oil-water separation filter structure 100-4.

The supporting device 200 supports the bottom of the oil-water separation filter structure 100-4, and forms a difference in height between the two ends of the oil-water separation filter structure 100-4.

In more detail, the supporting device 200 according to an embodiment of the present disclosure may include a height adjustment unit 210 to change the height difference between the two ends of the oil-water separation filter structure 100-4, and a pivot unit 230 connecting the bottom of the oil-water separation filter structure 100-4 to the top of the height adjustment unit 210.

First, the height adjustment unit 210 may have the bottom fixedly installed in the installation surface and the top coupled to the pivot unit 230.

In this instance, for example, a hydraulic cylinder or a pneumatic cylinder may be provided in the middle of the height adjustment unit 210 to change the length.

Meanwhile, the pivot unit 230 connects the bottom of the oil-water separation filter structure 100-4 to the top of the height adjustment unit 210, and the pivot unit 230 is provided as an element capable of rotating by the predetermined angle such as, for example, a hinge to change the angle a between the oil-water separation filter structure 100-4 and the installation surface with the change in length of the height adjustment unit 210.

That is, as the oil-water separation filter structure 100-4 is coupled with the supporting device 200 including the height adjustment unit 210 and the pivot unit 230, the supporting device 200 may not only form a difference in height between the two ends of the oil-water separation filter structure 100-4 but also change in the angle a to the installation surface depending on an oil spill cleanup environment.

Figure 13:
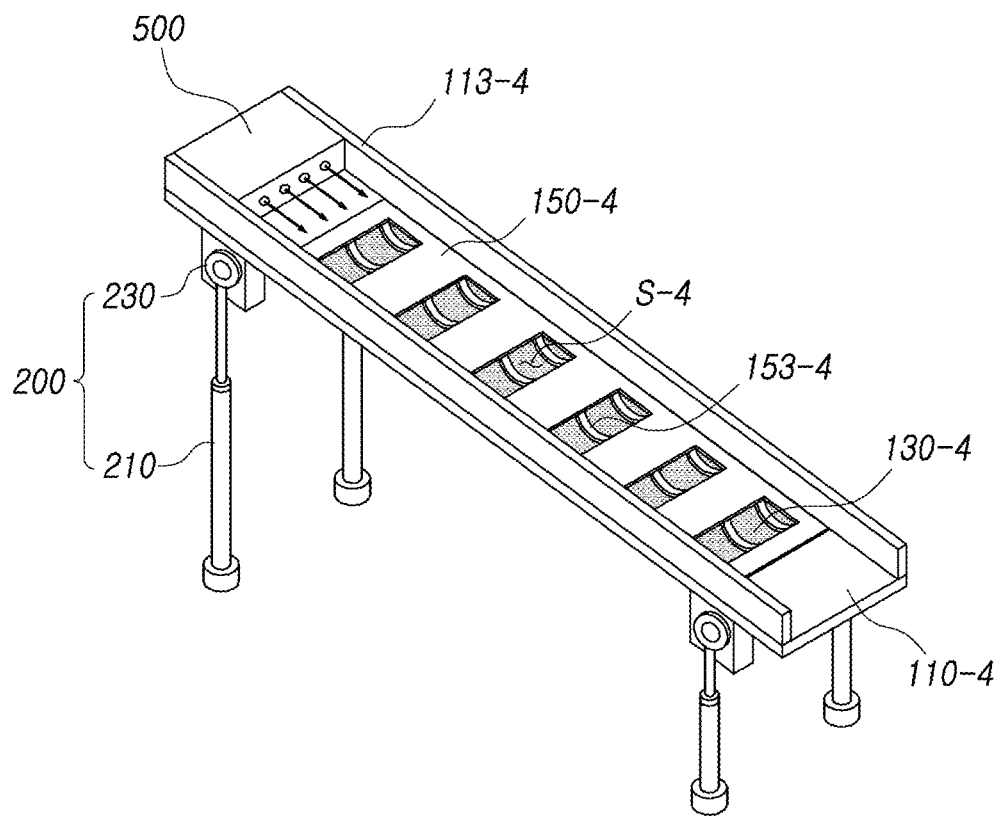
FIG. 13 is a perspective view showing a water membrane forming device provided in an oil-water separation filter structure included in an oil-water separator according to an embodiment of the present disclosure.

Meanwhile, the oil-water separator 10 according to an embodiment of the present disclosure further includes a water membrane forming device 500 to form a water membrane on the surface of the oil-water separation filter 130-4 by spraying water onto the oil-water separation filter 130-4 as shown in FIG. 13.

As described above, as the oil-water separation filter 130-4 includes the porous material 12 surface-treated to have hydrophilicity, a water membrane may be formed on the surface, and only the water 3 is allowed to pass while the passage of the oil 6 is prevented by the water membrane formed on the surface of the oil-water separation filter 130-4.

Accordingly, before the start of oil spill cleanup using the oil-water separator 10, it is necessary to form a water membrane on the oil-water separation filter 130-4 first, and accordingly, the oil-water separator 10 according to an embodiment of the present disclosure may include the water membrane forming device 500 to form a water membrane on the surface of the oil-water separation filter 130-4 by spraying water onto the oil-water separation filter 130-4.

The water membrane forming device 500 may be provided at, for example, the higher one of the two ends of the oil-water separation filter structure 100-4 to spray water onto the oil-water separation filter 130-4.

Figure 14:
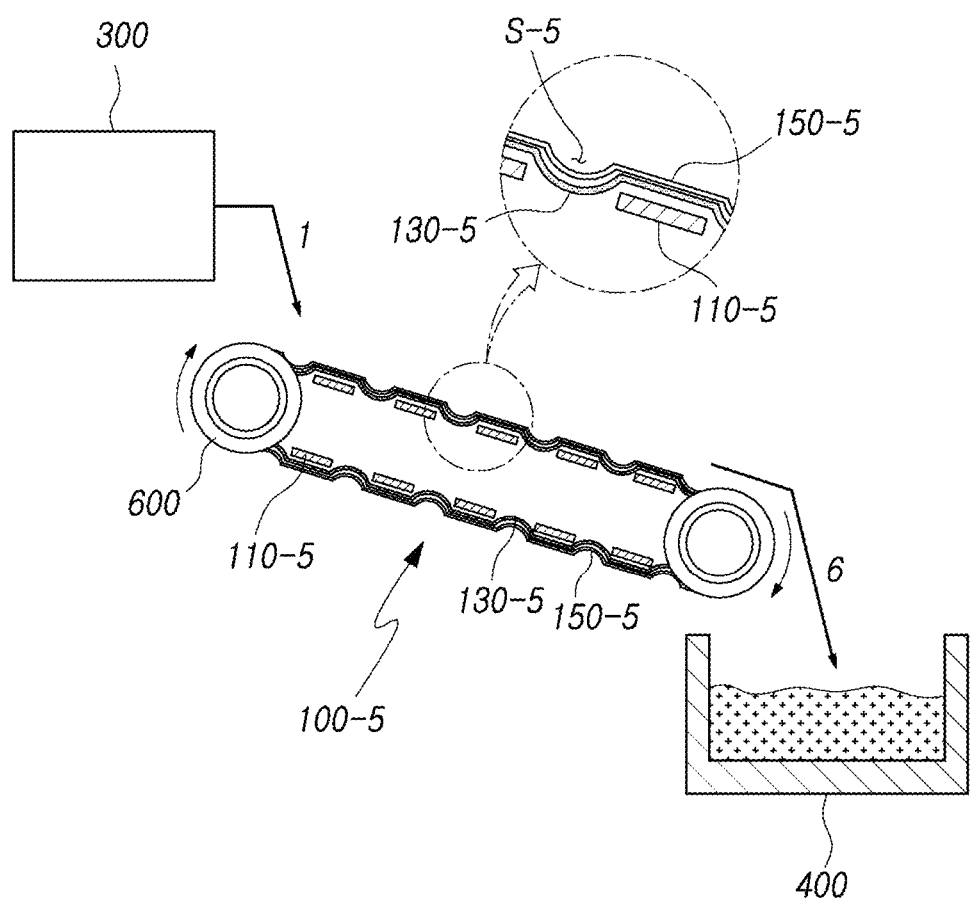
FIG. 14 is a side view showing an oil-water separator according to another embodiment of the present disclosure.

Subsequently, as shown in FIG. 14, the oil-water separator 11 according to another embodiment of the present disclosure may include a base guide 110-5 and a top guide 150-5 having flexibility, and in this instance, the oil-water separation filter structure 100-5 may form a belt by connecting the two ends and rotate by at least one rotation axis 600 coupled to the inner side.

The oil-water separation filter structure 100-5 is configured to rotate in the form of a belt conveyor to easily transport the oil 6 separated by an oil-water separation filter 130-5 and residing in an oil-water separation space S-5 to the separated oil storage 400.

Figure 15:
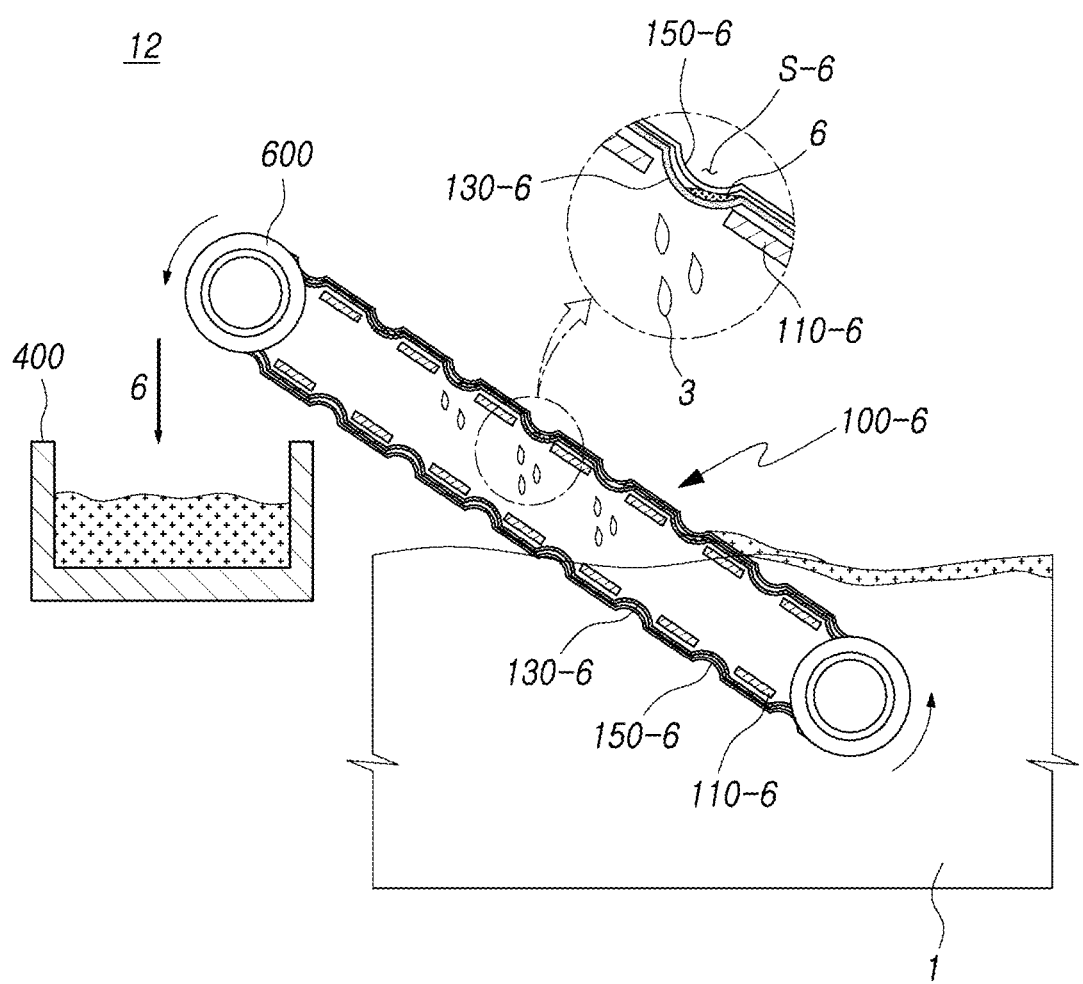
FIG. 15 is a side view showing an oil-water separator according to still another embodiment of the present disclosure.

Additionally, as shown in FIG. 15, an oil-water separator 12 according to still another embodiment of the present disclosure may include a base guide 110-6 and a top guide 150-6 having flexibility, and in this instance, an oil-water separation filter structure 100-6 may form a belt by connecting the two ends and rotate by at least one rotation axis 600 coupled to the inner side.

In this instance, the oil-water separator 12 may be configured such that any one of the two ends of the belt-type oil-water separation filter structure 100-6 is immersed in the mixed fluid 1 and the mixed fluid 1 received in an oil-water separation space S-6 formed in an oil-water separation filter 130-6 is transported upward to the remaining one of the two ends of the oil-water separation filter structure 100-6 to separate the oil 6 and the water 3 included in the mixed fluid 1.

That is, the oil-water separator 12 according to still another embodiment of the present disclosure may separate the water 3 and the oil 6 by transporting the mixed fluid 1 received in the oil-water separation space S-6 upward to the remaining one of the two ends of the oil-water separation filter structure 100-6 to discharge the water 3 in the downward direction of the oil-water separation filter 130-6.

Meanwhile, the separated oil storage 400 may be provided at the remaining one of the two ends of the oil-water separation filter structure 100-6 to collect the oil 6 separated from the mixed fluid 1 and residing in the oil-water separation space S-6.

As described hereinabove, the oil-water separation filter structures 100-1, 100-2, 100-3 according to the embodiments of the present disclosure include the hydrophilic material to separate the water 3 and the oil 6, and as opposed to the existing nonwoven fabric type filters, can be continuously used, thereby preventing environmental pollution problems.

Additionally, the oil-water separator 10 comprising the oil-water separation filter structure 100-4 according to an embodiment of the present disclosure separates the water 3 and the oil 6 while moving the mixed liquid 1 along the oil-water separation filter structure 100-4 having the slope, thereby achieving continuous and repeated collection of the oil 6 without any power supply other than the power for supplying the mixed liquid 1 to the oil-water separation filter structure 100-4.

Additionally, the oil-water separation space S-4 is formed in the oil-water separation filter 130-4 to increase the contact time and the contact area between the water 3 and the surface of the oil-water separation filter 130-4, thereby increasing the oil water separation efficiency of the oil-water separation filter 130-4.

Although the foregoing describes that all the elements constituting the embodiment of the present disclosure are combined into one or work in combination, the present disclosure is not necessarily limited to the disclosed embodiment. That is, the elements may be selectively combined into at least one and work in combination within the intended scope of the present disclosure.

The foregoing description is provided to describe the technical spirit of the present disclosure by way of example only, and it is obvious to those having ordinary skill in the technical field pertaining to the present disclosure that various changes and modifications may be made thereto without departing from the essential features of the present disclosure. Therefore, the embodiments disclosed herein is for the purpose of describing the technical spirit of the present disclosure, and is not intended to be limiting of this disclosure, and the scope of technical spirit of the present disclosure is not limited by these embodiments. The scope of protection of the present disclosure should be interpreted by the appended claims, and the full technical spirit within its equivalent scope should be interpreted as falling within the scope of protection of the present disclosure.

DETAILED DESCRIPTION OF MAIN ELEMENTS 10, 11, 12: Oil-water separator
100-1, 100-2, 100-3, 100-4, 100-5, 100-6: Oil-water separation filter structure
200: Supporting device
300: Fluid suction means
400: Separated oil storage
500: Water membrane forming device

What is claimed is:

1. An oil-water separation filter structure, comprising:
a base guide having a separated water outlet hole through which a fluid separated from a mixed fluid including an impurity exits;
an oil-water separation filter disposed on the base guide to separate the impurity and the fluid included in the mixed liquid; and
a top guide disposed on the oil-water separation filter, having at least one mixed fluid inlet hole through which the mixed fluid enters, and coupled to the base guide,
wherein the base guide has at least one separated water outlet hole at a location corresponding to the mixed fluid inlet hole, and
wherein the top guide includes a press portion on the mixed fluid inlet hole to press down a part of the oil-water separation filter into the separated water outlet hole.

2. The oil-water separation filter structure according to claim 1, wherein the oil-water separation filter includes a porous material surface-treated to have hydrophilicity.

3. The oil-water separation filter structure according to claim 2, wherein the porous material is hydrophilic when a contact angle with the water is 0 to 50°.

4. The oil-water separation filter structure according to claim 1, wherein the oil-water separation filter is a net type mesh which is a porous structure including mesh pores.

5. The oil-water separation filter structure according to claim 4, wherein the mesh pores are 1 to 1000 micrometers in diameter.

6. The oil-water separation filter structure according to claim 4, wherein fiber strands that form the net type mesh are 10 to 1000 micrometers in diameter.

7. The oil-water separation filter structure according to claim 4, wherein the oil-water separation filter has a nano-protrusion structure on a surface.

8. The oil-water separation filter structure according to claim 7, wherein the nano-protrusion structure is 1 to 100 nanometers in diameter.

9. The oil-water separation filter structure according to claim 7, wherein the nano-protrusion structure is 1 to 1000 nanometers in length.

10. An oil-water separator comprising an oil-water separation filter structure, the oil-water separator comprising:
the oil-water separation filter structure comprising:
a base guide having a separated water outlet hole through which a fluid separated from a mixed fluid including an impurity exits,
an oil-water separation filter disposed on the base guide to separate the impurity and the fluid included in the mixed liquid, and
a top guide disposed on the oil-water separation filter, having at least one mixed fluid inlet hole through which the mixed fluid enters, and coupled to the base guide; and
a supporting device coupled to a bottom of the oil-water separation filter structure and supporting two ends of the oil-water separation filter structure at different heights to form a predetermined angle between the oil-water separation filter structure and an installation surface,
wherein the base guide has at least one separated water outlet hole at a location corresponding to the mixed fluid inlet hole, and
wherein the top guide includes a press portion on the mixed fluid inlet hole to press down a part of the oil-water separation filter into the separated water outlet hole.

11. The oil-water separator comprising an oil-water separation filter structure according to claim 10, further comprising:
a water membrane forming device to form a water membrane on a surface of the oil-water separation filter structure by spraying water onto the oil-water separation filter structure.

12. The oil-water separator comprising an oil-water separation filter structure according to claim 10, wherein the oil-water separation filter structure forms a belt by connecting the two ends and rotates by at least one rotation axis coupled to an inner side.

13. An oil-water separator comprising an oil-water separation filter structure, the oil-water separator comprising:
the oil-water separation filter structure comprising:
a base guide having a separated water outlet hole through which a fluid separated from a mixed fluid including an impurity exits,
an oil-water separation filter disposed on the base guide to separate the impurity and the fluid included in the mixed liquid, and
a top guide disposed on the oil-water separation filter, having at least one mixed fluid inlet hole through which the mixed fluid enters, and coupled to the base guide; and
a supporting device coupled to a bottom of the oil-water separation filter structure and supporting two ends of the oil-water separation filter structure at different heights to form a predetermined angle between the oil-water separation filter structure and an installation surface,
wherein the supporting device comprises
a height adjustment unit to change a height difference between the two ends of the oil-water separation filter structure, and
a pivot unit connecting the bottom of the oil-water separation filter structure to a top of the height adjustment unit.

14. The oil-water separator comprising an oil-water separation filter structure according to claim 13, further comprising:
a water membrane forming device to form a water membrane on a surface of the oil-water separation filter structure by spraying water onto the oil-water separation filter structure.

15. The oil-water separator comprising an oil-water separation filter structure according to claim 13, wherein the oil-water separation filter structure forms a belt by connecting the two ends and rotates by at least one rotation axis coupled to an inner side.

* * * * *